No. 672,937. Patented Apr. 30, 1901.
G. GLASCOCK.
VEHICLE.
(Application filed May 31, 1900.)
(No Model.)
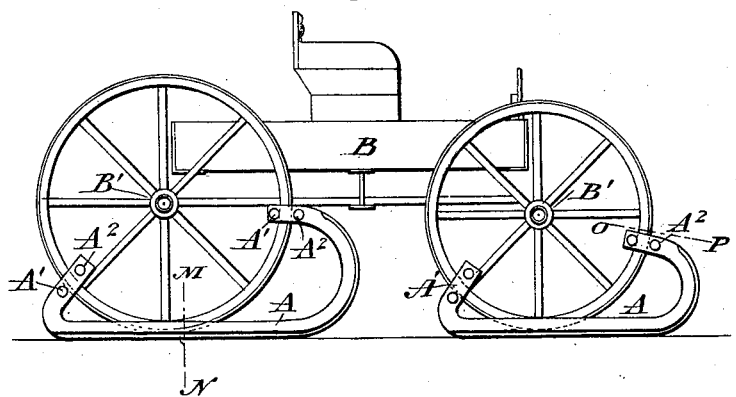
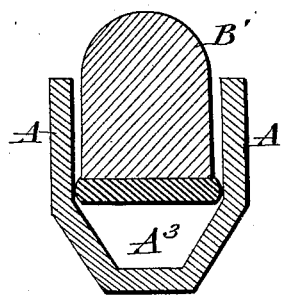
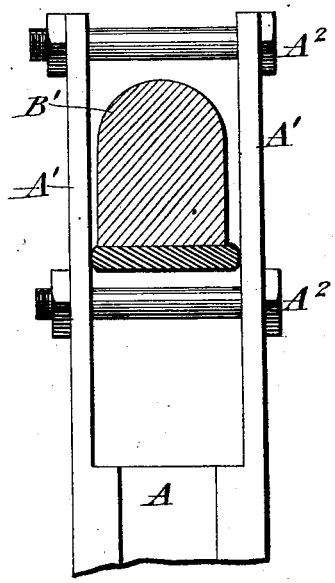
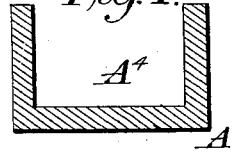
Witnesses: John Copeland, Horace Heath M.D.
Inventor: George Glascock

UNITED STATES PATENT OFFICE.

GEORGE GLASCOCK, OF VEEDERSBURG, INDIANA.

VEHICLE.

SPECIFICATION forming part of Letters Patent No. 672,937, dated April 30, 1901.

Application filed May 31, 1900. Serial No. 18,668. (No model.)

*To all whom it may concern:*

Be it known that I, GEORGE GLASCOCK, a citizen of the United States, residing at Veedersburg, in the county of Fountain and State of Indiana, have invented certain new and useful Improvements in Vehicles, of which the following is a specification.

My invention relates particularly to attachable and detachable runners for vehicle-wheels, and has for its object the production of a runner that may be attached to and detached from the wheels at will without removing the vehicle-wheels, which enables vehicles to be utilized during the snow season for pleasure-sleighs or hauling-sleds; and to this end my invention consists in the peculiar construction, combination, and arrangement fully set forth in the following description and claim.

Referring to the accompanying drawings, forming a part of this application, in which like letters of reference indicate corresponding parts throughout the several views, Figure 1 is an elevation of my invention entire attached to the wheels of a vehicle. Fig. 2 is a vertical section on the line M N, Fig. 1. Fig. 3 is a horizontal section on the line O P, Fig. 1. Fig. 4 is a transverse section of a modification of my invention. Fig. 5 is a transverse section of another modification of my invention.

In the construction of my invention I use bent runners A, preferably of steel, and the vehicle B, of a well-known style, which I have shown for the purpose of illustration, although my invention may be applied to any well-known pattern of light or heavy vehicles for either driving or hauling purposes. The runner A, which I have shown of bent steel, has a large curved fore portion and a short curved rear part, provided with forked ends A', as shown in Fig. 3, for the reception of the rim of the wheel B' at the desired points, which are rigidly secured therein by means of the through-bolts $A^2$. The through-bolts $A^2$ pass through suitable openings in the forked ends A' of the runner and are manipulated to rigidly secure the ends A' to the rim of the wheel B'. The runner A is provided with a U-shaped groove $A^3$ on its upper side for the reception of the lower portion of the rim of the wheel B' for shielding it and especially for protecting a wheel with a rubber tire. The runner used for heavy hauling-vehicles has a flat-bottomed groove $A^4$, as shown in the transverse section of my modification in Fig. 4. In Fig. 5 I have shown a transverse section of a modification of my invention which has no groove provided for the reception of the lower portion of the rim of the wheel B', which may be secured as desired.

My invention may be utilized with equal advantage on all classes of vehicles—such as buggies, carts, cabs, and wagons—during snowfalls suitable for sleighing or sledding, and it may be attached to or detached from each wheel of a vehicle in a very few minutes. The runners when detached may be conveniently carried in the vehicle-box, which enables my invention to be used on long journeys without detention at any time on account of the melting away of the snow, as frequently occurs in the use of the common sleigh or sled.

The economy of my invention is apparent, and modifications in form and substance may be made without departing from its spirit and scope.

Having thus fully described my invention and set forth the operation and advantages thereof, what I claim as new, and desire to secure by Letters Patent, is—

In a vehicle comprising the usual ordinary body and gear parts mounted on wheels, the combination of a detachable, integral runner rigidly secured to each wheel, the runner having a large curved fore and a short curved rear portion provided with forked ends for receiving the rim of the wheel, suitable means for securing the forked ends to the rim of the wheel and a long U-shaped groove on the upper, inner side of the runner for receiving and protecting the lower portion of the rim of the wheel, substantially as specified.

GEORGE GLASCOCK.

Witnesses:
O. U. PERRIN,
ALVAH GLASCOCK.